Jan. 8, 1924.
R. W. CUDWORTH
SLAUGHTERING DEVICE
Filed March 1, 1923
1,480,197
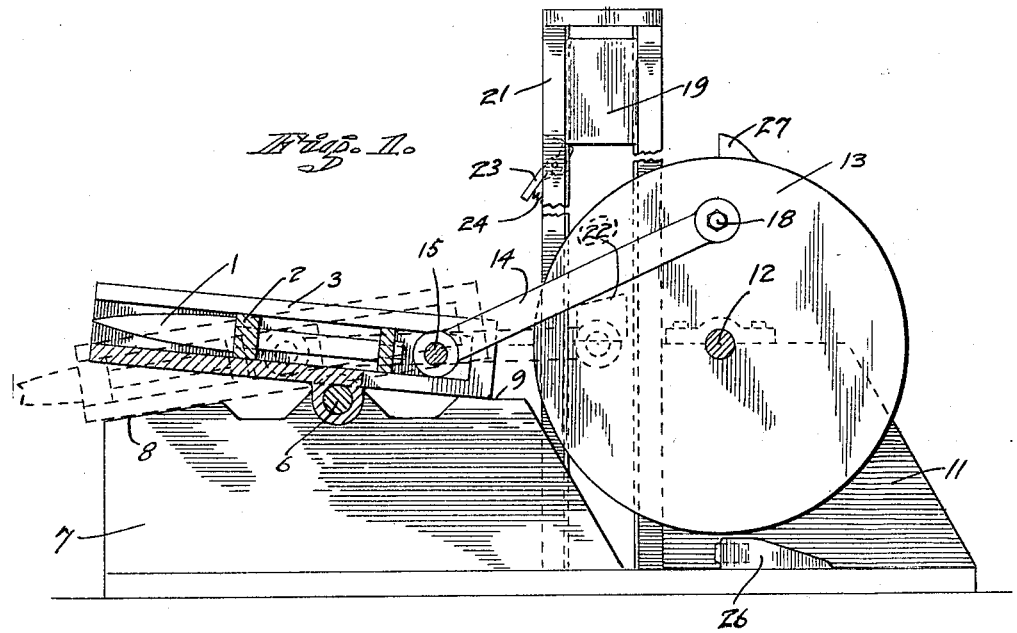
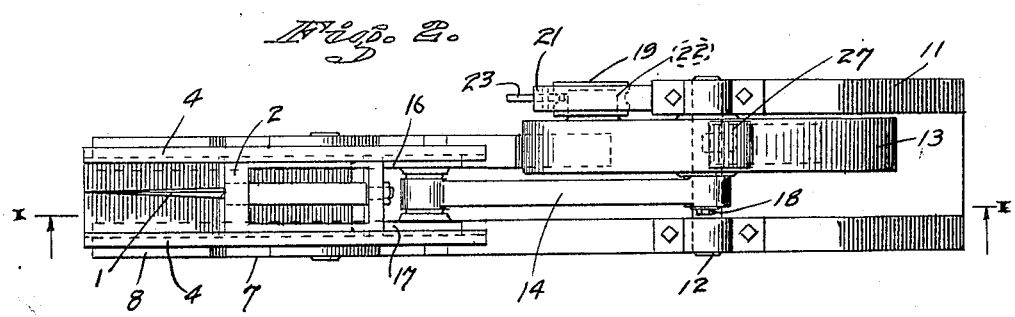
INVENTOR.
R.W. Cudworth
BY
ATTORNEYS.

Patented Jan. 8, 1924.

1,480,197

UNITED STATES PATENT OFFICE.

ROYAL W. CUDWORTH, OF SAN FRANCISCO, CALIFORNIA.

SLAUGHTERING DEVICE.

Application filed March 1, 1923. Serial No. 622,155.

*To all whom it may concern:*

Be it known that I, ROYAL W. CUDWORTH, a citizen of the United States, and a resident of San Francisco, county of San Francisco, State of California, have invented a new and useful Slaughtering Device, of which the following is a specification.

The present invention relates to improvements in slaughtering devices and has particular reference to improved means for thrusting a pointed knife into the body of the animal to be slaughtered in combination with means for simultaneously causing a tilting motion of the knife producing a cutting action. My device is particularly designed to be used in connection with an animal trap described in my copending application, Serial No. 620,448, filed February 21, 1923, and which allows the animal to be trapped in a portable cage in such a manner that the animal stands transversely to the direction of travel with its head projecting from the cage, its neck held between two stanchion bars and its body slightly raised so as to take the weight off its feet whereby the animal is prevented from struggling. The present device is designed to be assembled on the side of the track over which the portable cage moves and allows the operator to cause the knife blade to be thrust in the body of the animal with a cutting motion by the mere release of a weight or other actuating means.

The preferred form of the invention is illustrated in the accompanying drawing in which Figure 1 shows a side view of my device, portions being shown in section along line 1—1 of Figure 2 and Figure 2 a top plan view of the same. While I have shown only the preferred form of the invention it should be understood that various changes or modifications may be made within the scope of the claims hereto attached without departing from the spirit of the invention.

The blade (1) which is preferably pointed in the manner shown in the drawing is secured by any suitable means to a handle (2) comprising a frame adapted to be slidably received in an elongated guide (3). The latter which engages the frame on both sides and is preferably provided with grooves (4) forming guideways for the frame (2) is tiltingly supported on a transverse shaft (6) resting in a base block (7). The latter block is formed to allow of limited tilting motion of the guide member only and is provided for this purpose with two slanting surfaces (8) and (9) engaging the front and rear ends of the guide member respectively. Behind this block is provided a second block (11) on which is supported a shaft (12) having a disc (13) secured thereto. One of the faces of this disc is operatively connected with the rear end of the frame (2) by means of a rod (14) engaging a pin (15) extending between the two longitudinal members (16) and (17) of the frame (2) and a pin (18) rising from the face of the disc. The relation of the parts is such that if the disc is turned so that the pin (18) moves from the full line position shown in Figure 1 to the dotted line position the frame carrying the knife blade is thrust forward and at the same time the guide frame is tilted whereby a cutting action is imparted to the blade. It will be noticed that the pin (15) at the beginning of the stroke is disposed on the right hand side of the shaft (6) while at the end of the thrust it is disposed on the left hand side of the shaft (6). While at the beginning of the thrust the pin (15) has a tendency to depress the rear end of the guide member (3) it depresses the front end of the said member at the end of the stroke so that while the stroke is executed the guide member tilts from the full line position shown in Figure 1 into the dotted line position causing the knife to produce a cutting action while in the body of the animal.

The disc may be actuated to perform its function in any suitable manner as for instance by means of a weight (19) slidably engaging a frame (21) striking a projection (22) rising from one of the faces of the disc. The weight may be held in an operative position by means of a small lever (23) pivoted in the frame (21) and forced into supporting relation with the weight (19) by means of a spring (24). If the latter is depressed by the operator the weight drops and renders the device active.

A stop (26) for the disc is provided below the same adapted to engage a projection (27) provided on the outer face of the disc for preventing the disc from going beyond one-half of a turn.

I claim:

1. In a slaughtering device, a knife blade adapted to cut at its point, a guide for the blade, and means for moving the blade in the guide thrusting the point into an animal to be slaughtered and of then giving a cutting motion to the blade.

2. A knife blade having a handle thereon, a guide member for the handle supported with freedom of tilting motion and means for imparting a forward thrust to the handle at a varying angle whereby the guide member is tilted and a cutting motion combined with the forward thrust.

3. A knife blade having a handle thereon, a guide member for the handle supported with freedom of tilting motion and means for imparting a forward thrust to the handle at a varying angle whereby the guide member is tilted and a cutting motion combined with the forward thrust, the point of engagement of the latter means passing the axis on which the guide member tilts during the forward travel.

4. A knife blade having a handle thereon, a guide member for the handle supported with freedom of tilting motion and means for imparting a forward thrust to the handle at a varying angle whereby the guide member is tilted and a cutting motion combined with the forward thrust, and means for limiting the tilting motion of the guide member.

5. A knife blade having a handle thereon, a guide member for the handle supported with freedom of tilting motion and a rod pivotally engaging the handle having a rotating support for its free end adapted to impart a forward thrust to the knife while simultaneously tilting the guide member.

6. A knife blade having a handle thereon, a guide member for the handle supported with freedom of tilting motion, a rod pivotally engaging the handle, a disc rotatably mounted rearwardly of the guide member having a pin extending from its face engaging the free end of the rod, a projection on the disc and a weight adapted to be dropped on the projection for imparting rotary motion to the disc.

ROYAL W. CUDWORTH.